UNITED STATES PATENT OFFICE.

EDWARD C. R. WALKER AND CHARLES McBURNEY, OF BOSTON, MASSACHUSETTS, ASSIGNORS TO CHARLES McBURNEY, OF SAME PLACE.

IMPROVEMENT IN VULCANIZING RUBBER.

Specification forming part of Letters Patent No. 125,707, dated April 16, 1872.

*To all whom it may concern:*

Be it known that we, EDWARD C. R. WALKER and CHARLES McBURNEY, both of Boston, in the county of Suffolk and State of Massachusetts, have invented an Improvement in Vulcanizing Rubber; and we hereby declare that the following is a full, clear, and exact description of the same.

The vulcanization, so called, of India-rubber goods is the last step and the most important one in their manufacture. Any improvement, therefore, which tends to a saving of time and expense in this process will be readily appreciated by all manufacturers of rubber goods.

To thoroughly understand our improvement we will first describe the present most common method of vulcanization.

The rubber, having first been made up by hand and machinery to the required form, is heated and vulcanized by steam in the following manner. Large cylinders of any desired size, (sometimes five feet in diameter and fifty feet or more in length,) made of boiler-iron, and with a heavy iron door at one end, are used. Carriages are made to run in and out of these cylinders, and on these carriages the goods to be vulcanized are placed, having been closed up in a mold or not, according to the nature of the rubber compound and the desired form of the article. The carriage when loaded is run into the cylinder, the door of which is then closed and bolted, and steam from a boiler is admitted through pipes for the purpose of raising the temperature to the required degree. After the goods have been heated the required length of time the steam is allowed to escape from the cylinder.

By this method it is found necessary to keep the goods in the heat for a long time, varying from one hour to six hours, and to keep the steam up to a high degree of heat, say from 240° to 300° Fahrenheit, according to the nature of the rubber compound. As can be easily seen this is a most expensive and tedious method.

The cylinders and carriages are costly machines, and a large amount of fuel is consumed in the production of the steam; and when it is withdrawn from the cylinder it is of no further use.

Particularly with small molded articles is there a great waste of time and money; for, to produce large quantities of articles of the same shape many molds are required, which add greatly to the expense.

Now our improvement obviates the tediousness and expense of the above method in a great measure; and consists in the molds and apparatus hereinafter described, used in connection with the well-known oil-bath. This bath is one of the best-known means among chemists for applying a moderate heat to any article, the oil retaining its heat for a great length of time. Having heated the oil to the desired temperature, the molds filled with rubber are immersed therein, and in ten or fifteen minutes the rubber is vulcanized, when the molds can be taken out and instantly cooled in cold water, to be again filled with rubber and again heated.

We form our molds for vulcanizing with two plates, one resting on the other. The greater part of the lower plate may be provided with ribs or projections on its under side to increase the area of heating surface. We construct a copper pan usually about nine feet long, two feet wide, and six inches deep, built into brick-work, and heated from beneath. We find that ten or twelve "Bunsen" gas-burners answer a good purpose for heating. The lower plate of our mold has a downward projection, which passes below the surface of the oil-bath. The rubber to be vulcanized is placed in the molds or between the two plates, and these plates are screwed together, after which they are subjected to the oil-bath.

Instead of heating the oil under the molds it may be heated in a vessel over a fire, and then be drawn off through pipes into the pan beneath the lower plate, and into a receptacle which may be formed on the top of the upper plate. Having thus imparted its heat, the oil is drawn off and pumped back into the large vessel to be again heated, and so on continuously.

The advantages of our method of vulcanizing are the following: First, it saves time.

Second, it saves fuel. Third, it saves machinery, such as cylinders and carriages. Fourth, it can be used in places where steam cannot be easily introduced.

Claim.

What we claim, and desire to secure by Letters Patent, is—

The above-described process of vulcanizing rubber by means of the molds, plates, pipes, and oil-bath, all arranged as set forth.

Witness our hands this 25th day of October, A. D. 1871.

E. C. R. WALKER.
CHARLES McBURNEY.

In presence of—
P. E. TESCHEMACHER,
N. W. STEARNS.